United States Patent [19]

Horimai et al.

[11] Patent Number: 4,771,347
[45] Date of Patent: Sep. 13, 1988

[54] MAGNETO-OPTICAL RECORDING SYSTEM

[75] Inventors: Hideyoshi Horimai, Chiba; Osamu Kawakubo, Saitama; Yoshio Aoki, Tokyo, all of Japan

[73] Assignee: Sony Corporation, Tokyo, Japan

[21] Appl. No.: 942,971

[22] Filed: Dec. 17, 1986

[30] Foreign Application Priority Data

Dec. 27, 1985 [JP] Japan .................................. 60-294858

[51] Int. Cl.$^4$ .......................... G11B 5/02; G11B 11/00; G11B 3/70
[52] U.S. Cl. ........................................ 360/59; 369/13; 369/284
[58] Field of Search .................................... 360/59, 114; 369/13-15, 275, 283, 284, 286; 265/122

[56] References Cited

U.S. PATENT DOCUMENTS 4,612,587  9/1986  Kaneko et al. ......................... 360/59
4,694,358  9/1987  Muchwile et al. ..................... 360/59

*Primary Examiner*—Vincent P. Canney
*Attorney, Agent, or Firm*—Hill, Van Santen, Steadman & Simpson

[57] ABSTRACT

Disclosed is herein a magneto-optical recording system comprising: preparing a magneto-optical recording medium comprising a magneto-optical recording layer and a bias magnetic field formed on a transparent substrate, the magneto-optical recording layer having Curie temperature higher than room temperature, the bias magnetic layer having compensation temperature higher than Curie temperature, the magneto-optical recording layer and the bias magnetic layer being superposed having a nonmagnetic layer therebetween, and applying heating means to the magneto-optical recording medium having first and second heating power levels, the first heating power level being selected enough to heat the magneto-optical recording layer higher than the Curie temperature of the magneto-optical recording layer and to heat the bias magnetic layer higher than the compensation temperature of the bias magnetic layer, the second heating power level being selected enough to heat the magneto-optical recording layer higher than the Curie temperature of the magneto-optical recording layer while keeping the bias magnetic layer below the compensation temperature of the bias magnetic layer.

3 Claims, 7 Drawing Sheets

Temperature T

Temperature T

MAGNETO-OPTICAL RECORDING SYSTEM

BACKGROUND OF THE INVENTION

1. (Field of the Invention)

The present invention relates to a magneto-optical recording system, and more particularly to a magneto-optical system which can achieve over-writing of the information.

2. (Prior Art)

FIG. 6 shows a sectional structure of an essential part of the prior art magneto-optical recording medium, e.g., a magneto-optical disc. As shown in FIG. 6, a pair of transparent substrates 1 each has recording track position detecting grooves on one side surface thereof. A perpendicular anisotropy magnetic layer 2 formed of rare earth metal and transition metal is formed by deposition on the one side surface where the grooves are formed. Then, both the substrates 1 are bonded by an adhesive material 3 with the perpendicular anisotropy magnetic layers 2 opposed to each other. Protective layers 4 are formed by deposition between the substrate 1 and the magnetic layer 2 and between the magnetic layer 2 and the adhesive layer 3.

As shown in FIG. 7 which is a schematic illustration of a magnetized condition, the perpendicular anisotropy magnetic layer 2 generates perpendicular magnetization Ms by the sum of rare earth metal spin $S_{RE}$ and transition metal spin $S_{TM}$ in the layer thickness direction or in the vertical direction.

Recording to the perpendicular anisotropy magnetic layer 2 is carried out by thermal magnetic recording such as Curie temperature recording or compensation temperature recording. In case of the Curie temperature recording, an external magnetic field is applied to a recording portion by magnetic field generating means 5 as shown in FIG. 6. Under this condition, a laser beam 6 is irradiated through a condenser lens system 7 to the magnetic layer 2 to be recorded on the back side of the substrate 1 in such a manner as to focus on the magnetic layer 2, thereby heating the focused portion to a temperature higher than the Curie temperature and inverting the direction of magnetization by the external magnetic field, thus effecting the recording. In other words, under an erased condition or an unrecorded condition, the direction of magnetization is uniform as a whole as shown in FIG. 8. In contrast, under a recorded condition, the direction of magnetization at recording portions 2W is reversed to that at the other portions as shown in FIG. 9.

Recording to the perpendicular anisotropy magnetic layer is suitable for high-density recording. The aforementioned thermal magnetic recording such as Curie temperature recording or compensation temperature recording commonly has an advantage such that an external magnetic field required for recording or erasing information is remarkably less than that in a so-called magnetic recording using a magnetic tape or a magnetic disc.

However, actually there are various problems in applying an external magnetic field to this kind of magneto-optical recording medium. In the case that the external magnetic field is applied to only a minute region of a perpendicular magnetization layer, there has been proposed a method of generating a magnetic field in a limited minute region by forming a conductor pattern by a fine patterning technique such as a photolithography technique and supplying electric current to the conductor pattern. However, in this method, there occur technical and cost problems in applying a magnetic field to an arbitrary minute region in a large area.

Furthermore, inductance of a winding in generation of a magnetic field hinders driving of the magnetic field with a high frequency. To reduce the inductance of the winding, the number of windings is required to be reduced. However, the reduction in the number of windings creates the necessity of increasing the current value so as to generate a desired magnetic field, resulting in a large driving power source and an increase in power consumption.

Additionally, the above conventonal magneto-optical recording medium cannot effect over-writing. Namely, in a recording operation, a stray field $H_{SF}$ is generated by magnetization in the periphery of an area where the temperature is elevated to the Curie temperature by irradiation of a laser beam on an area where the coercive force HC is decreased in the case of the compensation temperature recording and a recording permissible (reversal of magnetization) temperature (which will be hereinafter referred to as a recording temperature) is reached. As a result, particularly in erasing, the stray field acts to eliminate the external magnetic field required for erasing information. Therefore, a large external magnetic field is required for erasing. FIG. 10 shows a condition where a part a is heated to the Curie temperature or a recording temperature by irradiating a laser beam 6 to the perpendicular anisotropy magnetic layer 2. While magnetization at the part a is eliminated at the Curie temperature for example, the stray field $H_{SF}$ is generated at the part a by magnetization Ms in the periphery of the part a. Accordingly, when an external magnetic field is applied to the part a to record or erase information, an effective magnetic field is affected by the stray field $H_{SF}$. In recording, since a recording portion has magnetization having a direction reversed to that of peripheral magnetization, an external magnetic field $H_{exw}$ upon recording has a direction same as that of the stray field $H_{SF}$, but an external magnetic field $H_{exe}$ upon erasing has a direction reversed to that of the stray field $H_{SF}$. Therefore, effective magnetic fields $H_{effw}$ and $H_{effe}$ upon recording and erasing, respectively, are represented by the following equations (1) and (2).

$$H_{effw} = H_{SF} + H_{exw} \ldots \quad (1)$$

$$H_{effe} = -H_{SF} + H_{exe} \ldots \quad (2)$$

As the effective magnetic field upon erasing is small, the external magnetic field $H_{exe}$ is required to be increased.

In an ideal case where a sufficient inversed magnetic domain may be obtained without the external magnetic field $H_{exw}$, the effective magnetic field $H_{effw}$ upon recording will be obtained by the stray field $H_{SF}$ only. However, even in such an ideal case, it is necessary to apply an external magnetic field $H_{exe}$ at least exceeding the stray field $H_{SF}$ upon erasing. Further, in order to effect sufficient inversion of magnetization, an external magnetic field $H_{exe}$ about double the stray field $H_{SF}$ is required. Actually, about several hundreds of Oe to several kOe of the external magnetic field are required for saturating the inversed magnetic domain upon recording. Such magnitude of a magnetic field is required for the external magnetic field $H_{exe}$ upon erasing.

It is necessary to reduce the stray field $H_{SF}$ to as little as possible, so as to reduce the external magnetic field $H_{exe}$ upon erasing. The stray field $H_{SF}$ may be reduced to some extent by making the composition of the magnetic layer 2 nearly equal to a compensation composition which may reduce saturation magnetization Ms of the magnetic layer 2. However, the coercive force Hc is increased to make magnetizing difficult and also make inspection of a magneto-optical disc, for example, as prepared troublesome. This is caused by the fact that the inspection of such a disc is generally carried out by use of a VSM (vibrating sample magnetometer) capable of generating a magnetic field of about 15 kOe. Therefore, another special measuring device is required to be used, or temperature is increased to reduce the coercive force Hc for measurement, which makes the operation complicated. Further, even when the magnetic layer 2 is prepared by reducing the saturation magnetization Ms only without increasing the coercive force Hc, the recording condition is rendered unstable, and high density recording cannot be carried out.

In the magneto-optical recording, a magneto-optical head for magneto-optically recording, reproducing and erasing information to a magneto-optical recording medium, that is, a magneto-optical head portion having laser beam irradiating means, optical lens system and magnetic field generating means is of a non-contact type where the head portion is retained and scanned at a desired distance from the magneto-optical recording medium. Therefore, the magnetic field generating means is separated from the magnetic layer of the recording medium at a considerable distance. As shown in FIG. 6, when a distance d between the magnetic field generating means and the recording medium is set to 1 mm, for example, a distance D between the magnetic field generating means and the magnetic layer 2 for recording, reproducing and erasing information by the irradiation of the laser beam 6 reaches about 2.5 mm in consideration of the thickness of the substrate 1 and the adhesive layer 3. Therefore, it is necessary to provide a considerably strong magnetic field generating means 5, so as to apply a magnetic field of several hundreds of Oe to several kOe to the objective magnetic layer 2. However, designing of such a strong magnetic field generating means 5 is accompanied by technically serious problems. In the case that the magnetic field generating means 5 is constituted of an electromagnet, for example, there will be generated a problem of power consumption or heat generation. When using a permanent magnet for the magnetic field generating means 5, it is difficult to accelerate a switching cycle of recording, reproducing and erasing, that is, a suitable inversion speed of magnetic field. When recording in a weak applied magnetic field C/N (carrier noise ratio) is low, and when erasing in a weak applied magnetic field, the previously recorded information cannot be fully erased. Therefore, when re-recording any information on the previously recorded area, that is, over-writing any information, information error is increased.

In Japanese patent Laid-Open Publication No. 59-60746, there is disclosed a magneto-optical recording medium including two magnetic layers. However, this recording medium does not have a bias magnetic field which is switched according to the present invention, which will be hereinafter described.

OBJECT AND SUMMARY OF THE INVENTION

It is an object of the present invention to provide an improved magneto-optical recording system.

It is another object of the present invention to provide a magneto-optical recording system which can achieve over-writing the information.

It is a further object of the present invention to provide a magneto-optical recording system which can achieve over-writing the information by using a laser beam having two levels of power.

According to one aspect of the present invention there is provided a magneto-optical recording system which comprises a magneto-optical recording medium comprising a magneto-optical recording layer and a bias magnetic layer formed on a transparent substrate, the magneto-optical recording layer having a Curie temperature higher than room temperature, the bias magnetic layer having compensation temperature higher than its Curie temperature, and the magneto-optical recording layer and the bias magnetic layer being superposed with a nonmagnetic layer therebetween, and applying heating means to the magneto-optical recording medium having first and second heating power levels.

The first heating power level is selected enough to heat the magneto-optical recording layer higher than the Curie temperature of the magneto-optical recording layer and to heat the bias magnetic layer higher than the compensation temperature of the bias magnetic layer, and the second heating power level is selected enough to heat the magneto-optical recording layer higher than the Curie temperature of the magneto-optical recording layer while keeping the bias magnetic layer below the compensation temperature of the bias magnetic layer.

DESCRIPTION OF THE PREFERRED EMBODIMENTS

Figure 1:
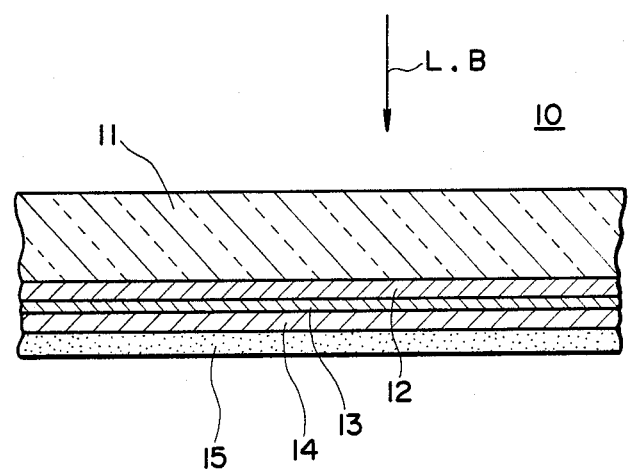
FIG. 1 is a sectional view of the magneto-optical recording medium employed in the present invention.

The present invention will be described with reference to FIG. 1, in which reference numeral 10 designates a magneto-optical recording medium. The magneto-optical recording medium 10 is formed by depositing a magneto-optical recording layer 12, a non-magnetic layer 13, a bias magnetic layer 14 and a protective layer 15 in this order onto one major surface of a transparent substrate 11.

Figure 2A:
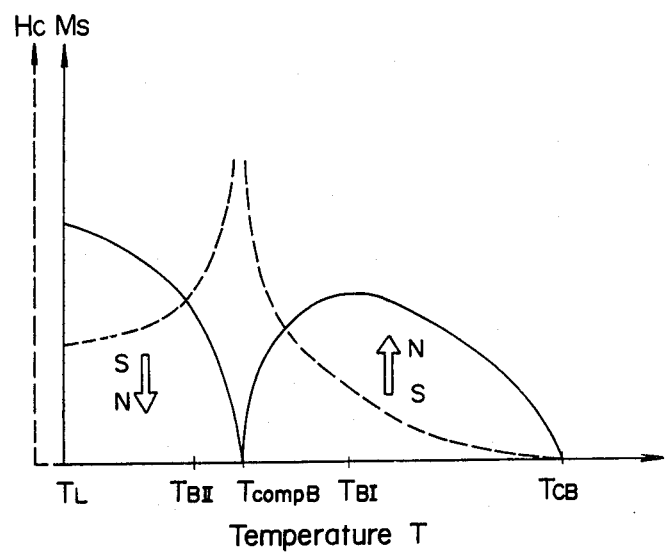
FIGS. 2A and 2B are graphs showing magnetic characteristics of the bias magnetic layer and the magneto-optical recording layer with respect to temperature according to the present invention.
Figure 7:
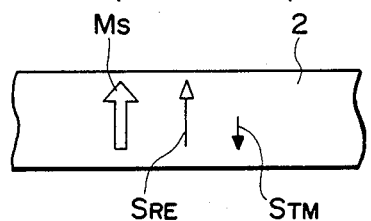
FIG. 7 is an illustration showing a magnetized condition of the prior art recording medium.
Figure 8:
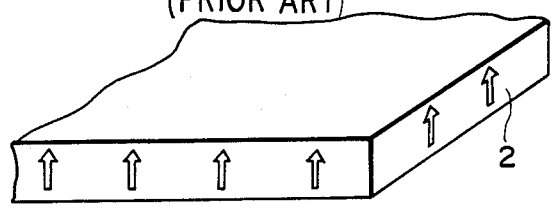
FIG. 8 is an illustration showing magnetization in an erased condition.
Figure 9:
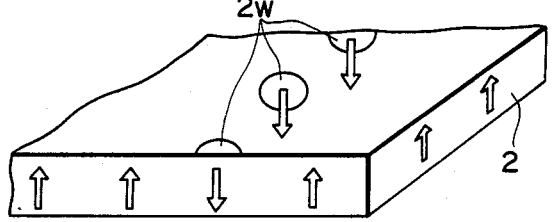
FIG. 9 is an illustration showing magnetization in a recorded condition.
Figure 10:
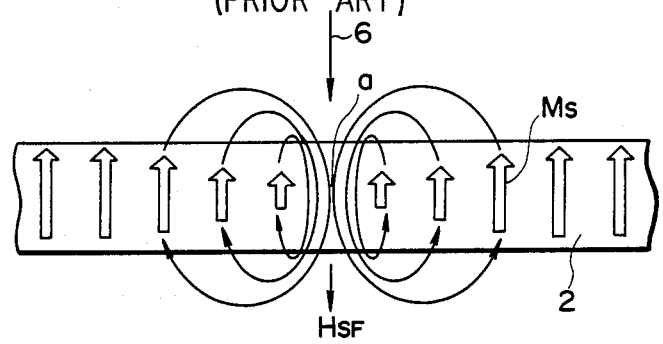
FIG. 10 is an illustration showing generation of a stray field.

Referring to FIG. 2A, temperature characteristics of saturation magnetization Ms of the bias magnetic layer 14 are shown by a solid line, and spontaneous magnetization condition is shown by arrows. The bias magnetic layer 14 has a compensation temperature $T_{compB}$ in a desired operational temperature range, e.g., in a temperature range between a room temperature $T_L$ and a desired temperature $T_{BI}$ higher than the room temperature $T_L$, and has characteristics such that the direction of the spontaneous magnetization is inverted across the compensation temperature $T_{compB}$, further having a Curie temperature $T_{CB}$ exceeding the temperature $T_{BI}$. Such characteristics may be attained by a ferrimagnetic material, e.g., rare earth metal-transition metal alloy. As previously mentioned with reference to FIG. 7, the spin $S_{RE}$ of the rare earth metal element is parallel to the spin $S_{TM}$ of the transition metal element with the directions reversed to each other. Both the spins have independent temperature characteristics such that as temperature increases, magnitude of the magnetic moment varies. Therefore, magnitude and direction of magnetization dependent upon the magnetic moment varies with temperature to thereby obtain the characteristics where the direction of the spontaneous magnetization is inverted across the compensation temperature $T_{compB}$. In this case, temperature characteristics of the coercive force Hc are shown by a dotted curve in FIG. 2A.

Figure 4A:
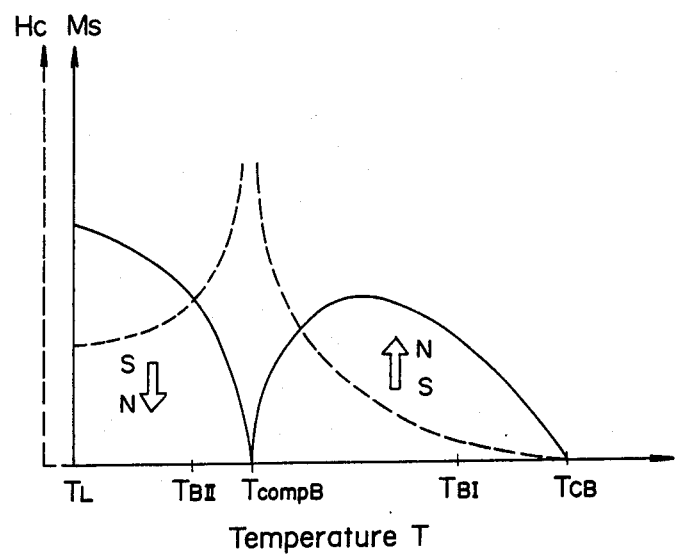
FIGS. 4A and 4B are graphs showing magnetic characteristics of the bias magntic layer and the magneto-optical recording layer with respect to temperature according to the present invention.

The magneto-optical recording layer 12 is formed of a rare earth metal-transition metal magnetic material having a Curie temperature $T_{CR}$ between the room temperature $T_L$ and a recording temperature $T_{RI}$ which will be explained later as shown by a solid line in FIG. 2B. Considering the case when only one laser beam is used for recording, the Curie Temperature $T_{CR}$ is selected higher than the compensation temperature of the bias magnetic layer 14, $T_{compB}$, and lower than the recording temperature $T_{RI}$. Alternately, as shown by a solid line in FIG. 4A, the bias magnetic layer 14 may be formed of a magnetic material having characteristics such that the compensation temperature $T_{compB}$ is present in the operational temperature range of $T_L$-$T_{BI}$ of the bias magnetic layer 14. On the other hand, the magneto-optical recording layer 12 may be formed of a magnetic material having characteristics such that the compensation temperature $T_{compR}$ is present in the operational temperature range of $T_L$-$T_{RI}$ of the magneto-optical recording layer 12 as shown by a solid line in FIG. 4B. Temperature characteristics of coercive forces Hc of the bias magnetic layer 14 and the magneto-optical recording layer 12 are shown by dotted curves in FIGS. 4A and 4B, respectively.

The non-magnetic layer 13 interposed between the magneto-optical recording layer 12 and the bias magnetic layer 14 is formed of a heat insulating material having a thickness such that a magnetic field formed by the spontaneous magnetization of the bias magnetic layer 14 may affect the magneto-optical recording layer 12, and thereby both the magnetic layers 12 and 14 may be magnetostatically coupled with each other, but isolated to avoid exchange interaction therebetween, and further both the magntic layers 12 and 14 may be thermally separated from each other to some extent.

Recording, over-writing and erasing of information to the magneto-optical recording medium 10 is carried out by selective heating utilizing irradiation of a laser beam or the like wherein a first or a second power level may be selected.

Figure 3A:
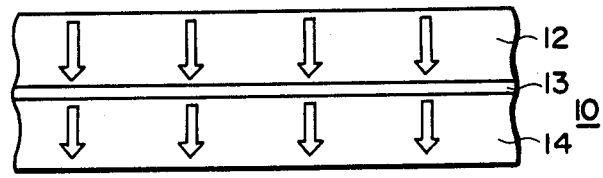
FIGS. 3A to 3D are illustrations showing a magnetized condition in operation of the magneto-optical recording medium according to the present invention.

That is to say, the first heating power level is in a heating condition where the magneto-optical recording layer 12 is heated to a temperature near the Curie temperature or over the temperature, and simultaneously, the bias magnetic layer 14 is heated to a temperature exceeding the compensation temperature. The second heating power level is in a heating condition where the magneto-optical recording layer 12 is heated to a temperature near the Curie temperature or over the temperature, and simultaneously, the bias magnetic layer 14 is heated to a temperature lower than the compensation temperature. In a final stage of production of the magneto-optical recording medium 10, for example, a magnetic field in the layer thickness direction is uniformly applied to the entire surface of the medium to magnetize both the magneto-optical recording layer 12 and the bias magnetic layer 14 in the same direction. FIG. 3A shows such a condition, that is, an unrecorded condition or a non-information condition.

According to the present invention, recording, over-writing and erasing of information may be carried out. This operation can be attained by scanning a laser beam L.B. from the transparent substrate 11 side to the magneto-optical recording medium 10 as shown in FIG. 1 and determining the heating condition by the first and second power levels.

Figure 2B:
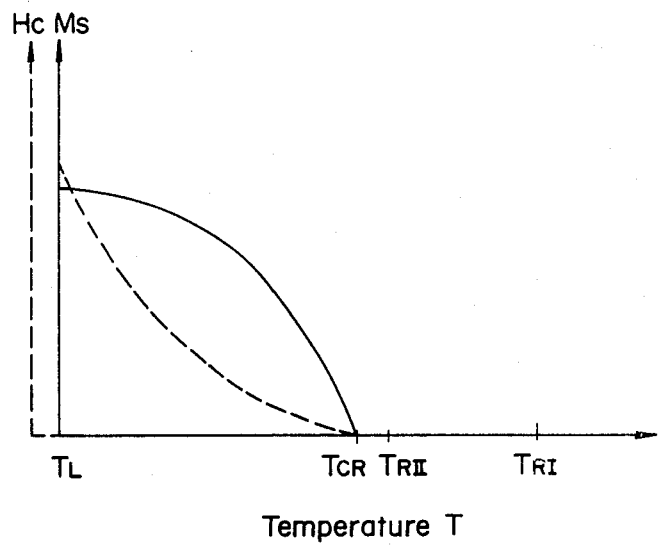
Figure 3B:
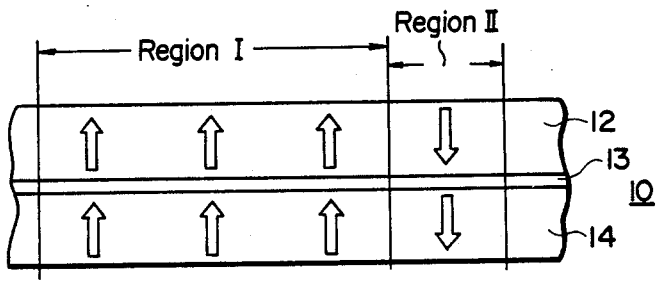
Figure 3C:
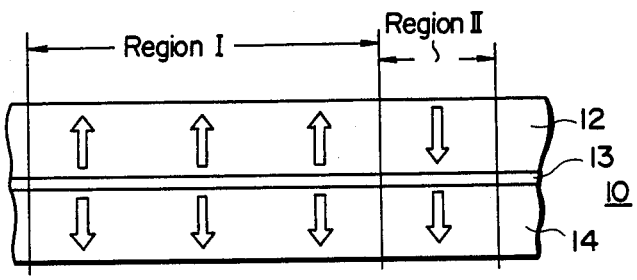

The following description is adapted to the case that the magneto-optical recording layer 12 is constituted of a magnetic layer having the temperature characteristics shown in FIG. 2B. The explanation will be first given that recording of information is carried out by changing magnetizations having reversed directions in regions I and II of the magneto-optical recording layer 12 as shown in FIG. 3C from the unrecorded condition or the non-information condition where the magneto-optical recording medium 10 is perpendicularly magnetized in one direction as shown in FIG. 3A. In this case, the region I is heated in the first high power level as previously mentioned, that is, the laser beam L.B. is focused on the magneto-optical recording layer 12 from the transparent substrate 11 side to thereby heat the recording layer 12 to a temperature near the Curie temperature $T_{CR}$ of the recording layer 12 or to the first high operational temperature $T_{RI}$ higher than the Curie temperature. In concert with this high-temperature heating, the bias magnetic layer 14 is heated to the first high operational temperature $T_{BI}$ higher than the compensation temperature $T_{compB}$ of the magnetic layer 14 and lower than the Curie temperature $T_{CB}$ of the magnetic layer 12. Thus, the direction of magnetization in the region I of the bias magnetic layer 14 is inverted as shown in FIG. 3B by heating the bias magnetic layer 14 to a temperature higher than the compensation temperature $T_{compB}$. Under this condition, when the laser beam is moved away for example, the layers 12 to 14 are cooled in the region I to allow the magneto-optical recording layer 12 to reach the Curie temperature $T_{CR}$. Although the bias magnetic layer 14 is also cooled, it is still maintained at a temperature higher than the compensation temperature $T_{compB}$ at this time, and the direction of magnetization in the region I of the bias magnetic layer 14 is maintained in the reversed condition as shown in FIG. 3B from the initial condition shown in FIG. 3A. To this end, magnetization generated in the region I of the magneto-optical recording layer 12 is inverted from the initial condition shown in FIG. 3A by magnetic coupling with the bias magnetic layer 14 and a stray field of the bias magnetic layer around the region I. Under this condition, the layers 12 to 14 in the region I are cooled to the room temperature $T_L$, and the bias magnetic layer 14 is cooled again to a temperature near the room temperature $T_L$ or lower than the compensation temperature $T_{compB}$ as shown by the solid line in FIG. 2A to thereby invert the magnetization to the initial condition. However, the coercive force Hc of the magneto-optical recording layer 12 is increased by the reduction in temperature as shown by the dotted curve in FIG. 2, and therefore the magneto-optical recording layer 12 is hardly influenced by the magnetization of the bias magnetic layer 14. To this end, the magneto-optical recording layer 12 in the region I is maintained in the reversed condition shown in FIG. 3C from the initial condition shown in FIG. 3A. Accordingly, in the magneto-optical recording layer 12, the direction of magnetization in the region I is different from that in the region II as shown in FIG. 3C, thereby effecting recording of information. Provided that the region II where the initial direction of magnetization is maintained is regarded as a recording part, the region I will serve as an erasing part.

Figure 3D:
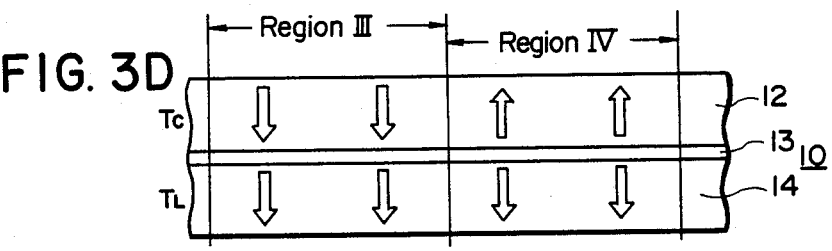

There will be now described the operation of over-writing of information to the medium 10 to which information has been recorded as shown in FIG. 3C. In this case, as shown in FIG. 3D, a recording part is formed by a region III which is a part of the region I, and an erasing part is formed by a region IV which is each part of the regions I and II. In the region III or the recording part, the heating condition of the second power level is effected. That is to say, a laser beam L.B. is irradiated onto the region III to heat the magneto-optical recording layer 12 to the second operational temperature $T_{RII}$ higher than the Curie temperature $T_{CR}$ of the magneto-optical recording layer and lower than the first operational temperature $T_{RI}$ as shown in FIG. 2B, thereby heating the bias magnetic layer 14 to the temperature $T_{BII}$ lower than the compensation temperature $T_{compB}$ of the bias magnetic layer 14 as shown in FIG. 2A. Thus, although magnetization of the magneto-optical recording layer 12 is lost once by heating the same to the temperature higher than the Curie temperature $T_{CR}$, when the heating by the laser beam is removed the magnetization direction of the magneto-optical recording layer is determined by a stray field of the magneto-optical recording layer around the region, and oriented in the same direction of the bias magnetic layer. In this case the direction of the magnetization in the bias magnetic layer is pointing to the direction not to avoid magneto static coupling of the two layers. In the region IV, the operation by the first power level as conducted in the region I is also conducted. In this way, the information of the pattern shown in FIG. 3D as different from the information of the pattern shown in FIG. 3C may be rewritten by the over-writing operation.

Reading of information from the magneto-optical recording medium 10 may be carried out similarly by the irradiation of the laser beam from the substrate 11 side. In this case, a power level of the laser beam in the magneto-optical recording layer 12 is selected to such an extent that the recording layer 12 is heated to a temperature lower than the Curie temperature $T_{CR}$ and the bias magnetic layer 14 is heated to a temperature lower than the compenstion temperature. Thus, reading is carried out by a magneto-optical effect.

Figure 4B:
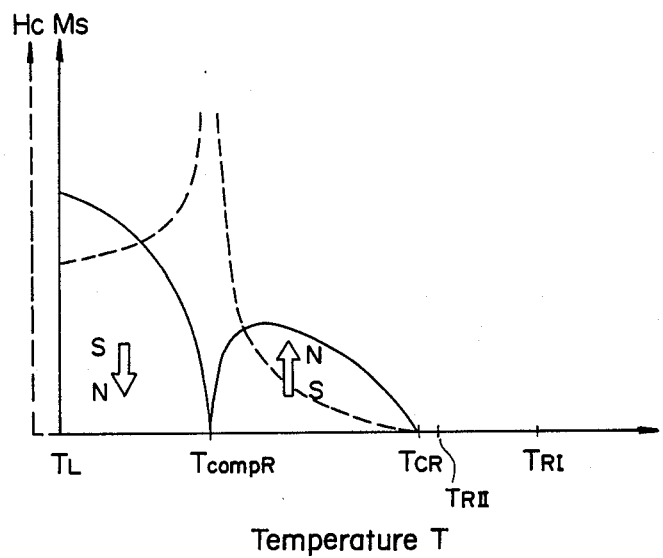

The above description is adapted to the case where the magneto-optical recording layer 12 is formed by a magnetic layer excluding a compensation temperature in its operational temperature range. Naturally, even in the case where the magnetic layer includes the compensation temperature $T_{compR}$ in its operational temperature range, it is effective to carry out recording, erasing and over-writing of information by the first and second power levels as mentioned above. However, there occurs no problem in this case since the direction of magnetization of the magneto-optical recording layer 12 is dependent upon the temperature lower than the Curie temperature $T_{CR}$ and higher than the compensation temperature $T_{compR}$. This is caused by the fact that a coercive force Hc is increased in a temperature area near the compensation temperature $T_{compR}$ as shown in FIG. 4B, and it is not affected magnetically by the bias magnetic layer 14. However, in this case, the relation of magnetization between the recording part and the erasing part in the magneto-optical optical recording layer 12 and the bias magnetic layer 14 is reversed.

In the case that the coercive force Hc of the magneto-optical recording layer 12 is reduced near the Curie temperature or at a temperature lower than the Curie temperature, and magnetization is inverted by the magnetic field from the bias magnetic layer 14, the non-magnetic layer 13 may be a film which may hinder the exchange interaction between the magneto-optical recording layer 12 and the bias magnetic layer 14. Therefore, both the layers 12 and 14 may be separated by the distance of two to three atoms layer thickness. For example, the non-magnetic layer 13 may be formed of a surface oxide layer of the magneto-optical recording layer 12. Further, the non-magnetic layer 13 only requires a slight heat insulating effect theoretically.

The above explanation was given in case of using one laser beam, however, if the condition is satisfied that the magneto-optical recording layer and the bias magnetic layer are magnetostatically coupled and the temperatures of the both layers are independently controlled, it is possible to achieve the operation by using two laser beams, one for heating the magneto-optical recording layer, and another for the bias magnetic field.

As explained above, the system of the present invention works basically without applying an external magnetic field. However, for better recording and erasing, a weak static external magnetic field may be applied. The external magnetic field should satisfy the condition that the direction is pointing to the magnetization direction to be recorded and the strength is enough to magnetically saturate the magneto-optical recording layer upon recording, though the strength is weak enough to magnetically saturate the magneto-optical recording layer upon erasing where, the vector sum of the stray field at the erased region and the external magnetic field is applied to the magneto-optical recording layer.

(EXAMPLE)

There will be now described an example of the magneto-optical recording medium used in the present invention. The transparent substrate 11 is formed of a glass plate or a resin plate such as polycarbonate resin. The substrate 11 is formed on its major surface with a tracking groove (not shown) as required. The magneto-optical recording layer 12 formed on the major surface is a magnetic layer of $Tb_{21}(Fe_{95}Co_5)_{79}$ having a thickness of 300–800 Å, e.g., 500 Å, for example.

The non-magnetic layer 13 is formed of $SiO_2$, $Si_3N_4$, ZnS, oxides of rare earth metal elements, yttria ($Y_2O_3$) or alumina ($Al_2O_3$). In case of using $Si_3N_4$, the thickness of the non-magnetic layer 13 is 100–400 Å, e.g., 200 Å.

The bias magnetic layer 14 is formed of $Tb_{21.8}Co_{78.2}$ having a thickness of 250–1800 Å, e.g., 800 Å, for example.

The protective layer 15 is formed of $Si_3N_4$, ZnS or SiO.

The thickness of the non-magnetic layer 13 and the magnetic temperature characteristics or composition and the thickness of the bias magnetic layer 14 are dependent upon the operational temperature of the bias magnetic layer and the effective magnetic field acting on the recording layer. Further, in order to let the magnetization of the magnto-optical recording layer 12 follow the effective magnetic field, the temperature characteristics of the magneto-optical recording layer 12 should be also taken into consideration as an important parameter. Furthermore, since the direction of magnetization of the magneto-optical recording layer 12 is dependent upon a magnetic energy to be applied to the magneto-optical recording layer 12, that is, magnetization Ms of the bias magnetic layer 14 and the aforementioned effective magnetic field, the thickness of the magneto-optical recording layer 12 is to be increased when the effective magnetic field is small.

Figure 5:
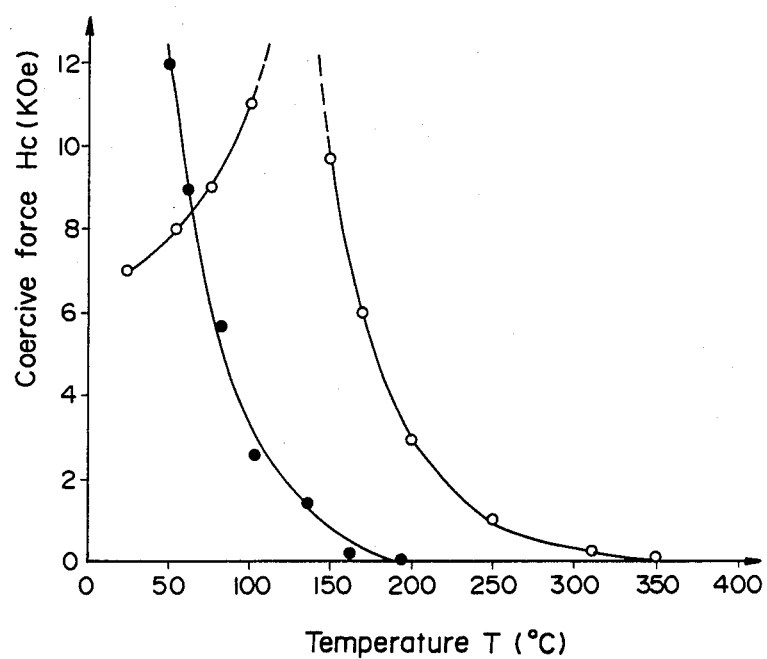
FIG. 5 is a graph showing measured results of the coercive force of the bias magnetic layer and the magneto-optical recording layer with respect to temperature according to the present invention.
Figure 6:
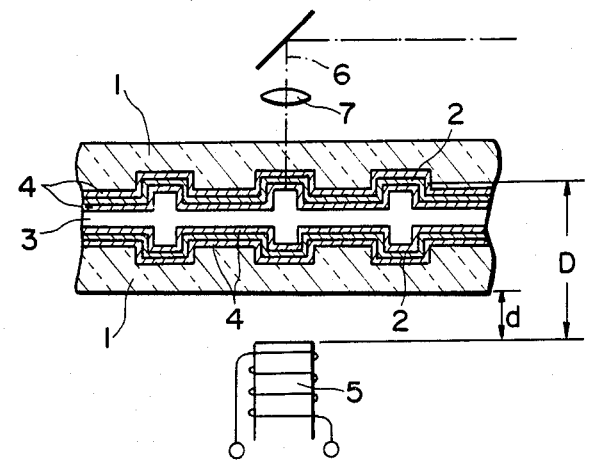
FIG. 6 is a sectional view of the magneto-optical recording medium in the prior art.

FIG. 5 shows temperature characteristics of a coercive force Hc, wherein the bias magnetic layer of $Tb_{21.8}Co_{78.2}$ is shown by blank dots, while the magneto-optical recording layer of $Tb_{21}(Fe_{95}Co_5)_{79}$ is shown by solid dots.

Although the preferred embodiment employs a laser beam for changing orientation of magnetization of the bias magnetic layer 14, that is, for effecting recording, erasing and over-writing, the heating operation may be carried out by using an electron beam.

Further, another protective layer may be interposed between the magneto-optical layer 12 and the substrate 11, so that a change in temperature increase and decrease in terms of time may be controlled in consideration of thermal diffusion due to a thickness and a material of both the protective layers sandwiching the layers 12 to 13.

According to the present invention, overwriting can be effected, and recording and erasing can be also effected without any external magnetic field generating means such as a permanent magnet or a coil, by selecting a heating power of laser beam irradiation for the magneto-optical recording medium 10 and thereby switching a bias magnetic field for the magneto-optical recording layer 12. A bias magnetic field generating means consisting of the bias magnetic layer 14 is provided in the medium 10 itself and arranged substantially adjacent to the magneto-optical recording layer 12, thereby greatly reducing a spacing loss. Thus, it is possible to remarkably reduce power consumption for carrying out the recording, erasing and re-recording of information. Moreover, the present invention may provide many important advantages such as simplicity of a device, increase in a switching speed and improvement in resolution.

We claim as our invention:

1. A magneto-optical recording system comprising: a magneto-optical recording medium comprising a magneto-optical recording layer and a bias magnetic field formed on a transparent substrate, said magneto-optical recording layer having a Curie temperature higher than room temperature, said bias magnetic layer having a compensation temperature higher than its Curie temperature, said magneto-optical recording layer and said bias magnetic layer being superposed and having a non-magnetic layer therebetween, and heating means acting on said magneto-optical recording medium and having first and second heating power levels, said first heating power level being enough to heat said magneto-optical recording layer higher than said Curie temperature of the magneto-optical recording layer and to heat said bias magnetic layer higher than said compensation temperature of said bias magnetic layer, said second heating power level being enough to heat said magneto-optical recording layer higher than said Curie temperature of said magneto-optical recording layer while keeping said bias magnetic layer below said compensation temperature of said bias magnetic layer.

2. A magneto-optical recording system according to claim 1, wherein the heating means is a laser beam having the first and second heating power level.

3. A magneto-optical recording system according to claim 1, wherein the bias magnetic layer is formed of ferrimagnetic material.

* * * * *